US011310435B2

(12) United States Patent
Kawasaki (10) Patent No.: US 11,310,435 B2
(45) Date of Patent: Apr. 19, 2022

(54) IMAGE PICKUP APPARATUS HAVING AUTO DAY-NIGHT FUNCTION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Ryo Kawasaki, Yokohama (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 0 days.

(21) Appl. No.: 17/105,803

(22) Filed: Nov. 27, 2020

(65) Prior Publication Data

US 2021/0084209 A1    Mar. 18, 2021

Related U.S. Application Data

(63) Continuation of application No. 16/416,526, filed on May 20, 2019, now abandoned.

(30) Foreign Application Priority Data

May 24, 2018    (JP) .............................. JP2018-099822

(51) Int. Cl.
  *H04N 5/235*    (2006.01)
  *G02B 5/20*    (2006.01)
  (Continued)

(52) U.S. Cl.
  CPC ........... *H04N 5/2352* (2013.01); *G02B 5/208* (2013.01); *H04N 5/2351* (2013.01); *G02B 7/006* (2013.01); *H04N 9/04* (2013.01)

(58) Field of Classification Search
  CPC .............................. H04N 5/2352; G02B 5/208
  See application file for complete search history.

(56) References Cited

U.S. PATENT DOCUMENTS 7,064,775 B2    6/2006  Takakuwa
7,911,528 B2 *  3/2011  Kawada ................. H04N 5/238
                                                    348/360
(Continued)

FOREIGN PATENT DOCUMENTS

CN    102111558 A    6/2011
CN    104079908 A    10/2014
(Continued)

OTHER PUBLICATIONS

Extended European Search Report issued in European Appln. No. 19175929.9 dated Aug. 22, 2019.
(Continued)

*Primary Examiner* — Jayanti K Patel
*Assistant Examiner* — Christopher Kingsbury Glover
(74) *Attorney, Agent, or Firm* — Rossi, Kimms & McDowell LLP (57) ABSTRACT

An image pickup apparatus that is capable of preventing hunching certainly at low cost and of switching between the day mode and the night mode at an optimal timing. An image sensor outputs an image signal depending on an optical image formed through an image pickup optical system. A mode setting unit sets a photographing mode for photographing using the image sensor from among a day mode and a night mode in which sensitivity for a wavelength range corresponding to infrared light is higher than that in the day mode. An obtaining unit obtains ratio information about the ratios of the infrared light and visible light based on the image signal in the night mode. A condition setting unit sets a determination condition that is used for switching the photographing mode to the day mode from the night mode based on the ratio information.

16 Claims, 8 Drawing Sheets

(51) Int. Cl.
  *G02B 7/00* (2021.01)
  *H04N 9/04* (2006.01)

(56) References Cited

U.S. PATENT DOCUMENTS

| | | |
|---|---|---|
| 9,386,230 B1 | 7/2016 | Duran |
| 2007/0070224 A1* | 3/2007 | Sasaki ............... H04N 5/23245 |
| | | 348/273 |
| 2008/0049115 A1 | 2/2008 | Ohyama |
| 2010/0141770 A1 | 6/2010 | Gomi |
| 2010/0283866 A1 | 11/2010 | Numata |
| 2016/0127659 A1* | 5/2016 | Kawasaki .......... H04N 5/23245 |
| | | 348/164 |

FOREIGN PATENT DOCUMENTS

| | | |
|---|---|---|
| JP | 2003219254 A | 7/2003 |
| JP | 2012047975 A | 3/2012 |

OTHER PUBLICATIONS

Office Action issued in U.S. Appl. No. 16/416,526 dated Feb. 24, 2020.
Notice of Allowance issued in U.S. Appl. No. 16/416,526 dated Aug. 28, 2020.
Office Action issued in Chinese Application No. 201910439395.8 dated Dec. 3, 2020. English translation provided.

* cited by examiner

IMAGE PICKUP APPARATUS HAVING AUTO DAY-NIGHT FUNCTION, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus, a control method therefor, and a storage medium storing a control program therefor, and in particular, relates to an image pickup apparatus that has an auto day-night function.

Description of the Related Art

Generally an image sensor used for an image pickup apparatus like a digital camera has sensitivity in a visible wavelength range from 380 nm to 780 nm. In the meantime, a human eye hardly has sensitivity in a long wavelength range beyond 700 nm. Accordingly, an image pickup apparatus like a digital camera employs an infrared cut filter for correcting a visual sensitivity in front of an image sensor. The infrared cut filter blocks out light in a near-infrared range so as to adjust color reproducibility to human visual sensitivity.

Such an image pickup apparatus can extract the infrared cut filter from an optical path to allow the light in the near-infrared range to pass to increase sensitivity in a low luminance state where object luminance is lowered.

However, when the light in the near-infrared range passes, color balance collapses, which requires the image pickup apparatus to switch a photographing mode to a monochrome image mode (night mode) from a color image mode (day mode).

There is an auto day-night function that automatically switches the photographing mode between the day mode and the night mode in accordance with the object luminance as one of methods for switching the photographing mode. For example, this function decides the object luminance on the basis of an image pickup signal (a luminance signal) output from an image sensor and EVs (exposure values, such as a shutter speed, an aperture value, and gain).

Incidentally, there is an image pickup apparatus that irradiates an object with infrared light using an infrared illumination device that is built in the image pickup apparatus or an infrared illumination device that is separated from the image pickup apparatus so as to photograph an object certainly even in the low luminance state. In this case, since the luminance varies greatly between the day mode and the night mode, what is called hunching that repeats mode switching in short time occurs.

In the meantime, if a threshold for switching the mode from the night mode to the day mode is set in order to prevent the hunching, the photographing in the night mode may continue without switching to the day mode even when the object luminance rises.

Moreover, there is a method that uses the auto day-night function on the basis of an output of an optical sensor that is separated from an image pickup optical system for photometry of visible light only in order to stabilize action of the auto day-night function. However, when this method is used, the cost of the image pickup apparatus rises due to addition of the optical sensor.

In order to avoid such a problem, an image pickup apparatus using the auto day-night function on the basis of a luminance signal and a color signal that are obtained from an image pickup signal is proposed (for example, see Japanese Laid-Open Patent Publication (Kokai) No. 2003-219254 (JP 2003-219254A)). The image pickup apparatus in this publication finds a color ratio of a red signal to a green signal and a color ratio of a blue signal to the green signal and determines whether image pickup with the infrared light (near-infrared light) is performing depending on whether the two color ratios concerned fall within a predetermined range.

It should be noted that the above-mentioned publication discloses that the sensitivities of sensor cells of an image sensor for the respective colors become almost the same in a long wavelength range beyond 800 nm and the above-mentioned two color ratios fall within the predetermined range when the image pickup signal is obtained by the infrared light. Then, when it is determined that the image pickup signal is obtained by the infrared light, the monochrome photographing mode is maintained and the hunching is prevented.

However, the image pickup apparatus disclosed in the above-mentioned publication does not determine that the light in the range from 650 nm to 800 nm, which differentiates the sensitivities of the sensor elements for the respective colors, is the infrared light. Accordingly, the hunching occurs unescapably under light sources, such as an incandescent lamp and sunlight, that include much lights in the range from 650 nm to 800 nm.

SUMMARY OF THE INVENTION

The present invention provides an image pickup apparatus, a control method therefor, and a storage medium storing a control program therefor, which are capable of preventing the hunching certainly at low cost and of switching between the day mode and the night mode at an optimal timing.

Accordingly, a first aspect of the present invention provides an image pickup apparatus including an image sensor that outputs an image signal depending on an optical image formed through an image pickup optical system, and at least one processor that executes a set of instructions to set a photographing mode for photographing using the image sensor from among a day mode and a night mode in which sensitivity for a wavelength range corresponding to infrared light is higher than that in the day mode, obtain ratio information about the ratios of the infrared light and visible light based on the image signal in the night mode, and set a determination condition that is used for switching the photographing mode to the day mode from the night mode based on the ratio information.

Accordingly, a second aspect of the present invention provides a control method for an image pickup apparatus provided with an image sensor that outputs an image signal depending on an optical image formed through an image pickup optical system, the control method including setting a photographing mode for photographing using the image sensor from among a day mode and a night mode in which sensitivity for a wavelength range corresponding to infrared light is higher than that in the day mode, obtaining ratio information about the ratios of the infrared light and visible light based on the image signal in the night mode, and setting a determination condition that is used for switching the photographing mode to the day mode from the night mode based on the ratio information.

Accordingly, a third aspect of the present invention provides a non-transitory computer-readable storage medium storing a control program causing a computer to execute the control method of the second aspect.

According to the present invention, the hunching is prevented at the low cost and the day mode and the night mode are switched at the optimal timing.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Figure 1:
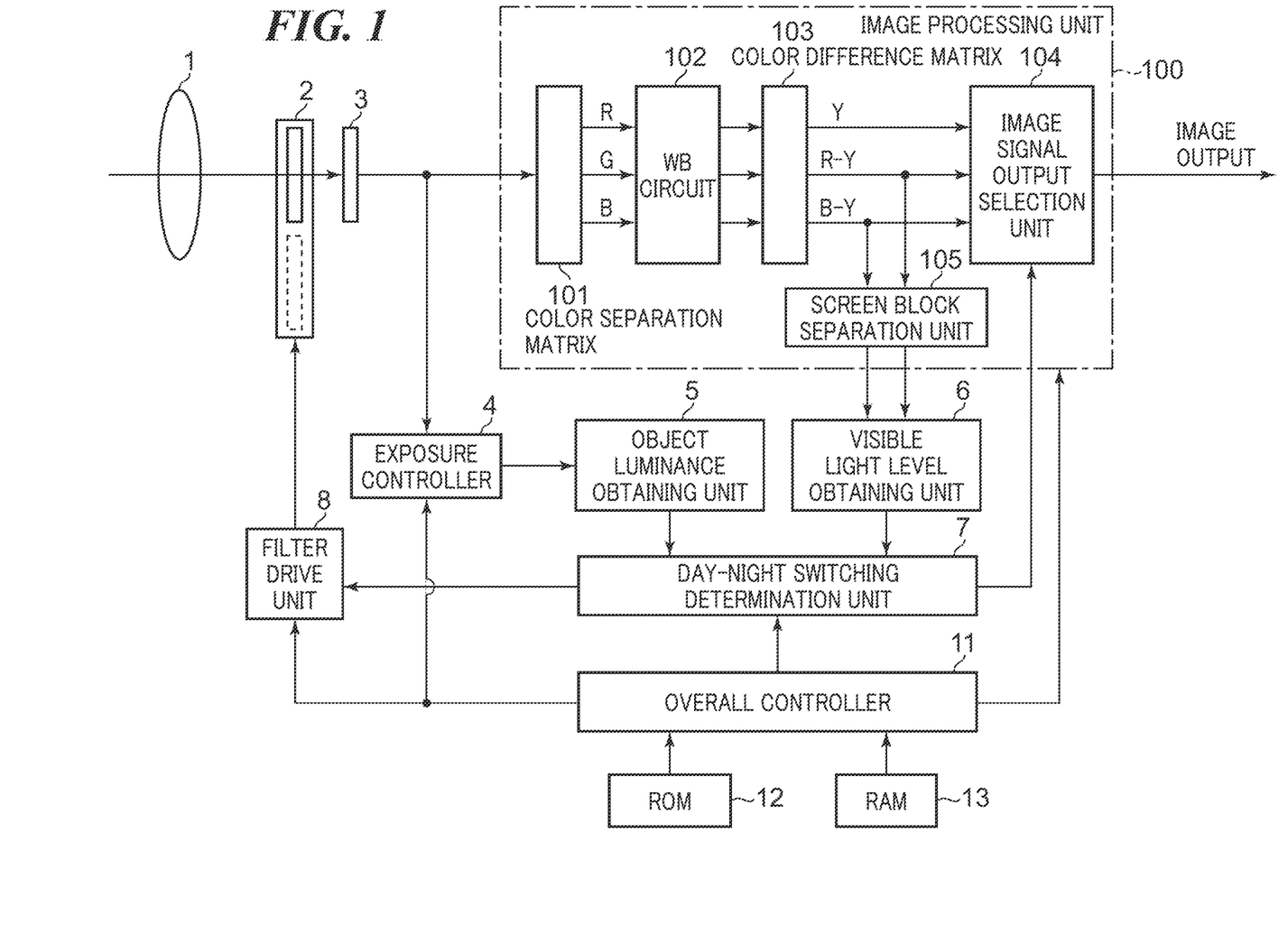
FIG. 1 is a block diagram schematically showing a configuration of an example of an image pickup apparatus (a camera) according to a first embodiment of the present invention.

FIG. 1 is a block diagram schematically showing a configuration of an example of an image pickup apparatus according to a first embodiment of the present invention.

The illustrated image pickup apparatus is a digital camera (hereinafter referred to as a "camera" simply), for example, and has an overall controller (a CPU) 11. The overall controller 11 develops a program stored in a nonvolatile memory (ROM) 12 to a volatile memory (RAM) 13 and runs the program to control the entire camera. It should be noted that the RAM 13 is used also as a work area of the overall controller 11.

Object light that enters through an image pickup optical system 1 forms an optical image on an image sensor 3. Then, the image sensor 3 outputs an image signal corresponding to the optical image. The image signal concerned is output to an exposure controller 4 and an image processing unit 100. An infrared cut filter 2 provided with an attenuation area that reduces intensity of light in a wavelength range corresponding to infrared light in the object light is arranged between the image pickup optical system 1 and the image sensor 3. The infrared filter 2 is capable of extracting from and inserting into an optical path.

The exposure controller 4 controls an aperture value, a shutter speed, and a gain value on the basis of the image signal so that an object luminance will become suitable. An object luminance obtaining unit 5 obtains the object luminance from the exposure control module 4.

The image processing unit 100 is provided with a color separation matrix 101. The color separation matrix 101 divides the image signal into a red signal R, blue signal B, and green signal G. Then, a WB circuit 102 adjusts white balance (WB) by adjusting an R gain and a B gain on the basis of the red signal R, blue signal B, and green signal G.

A color difference matrix 103 converts the red signal R, blue signal B, and green signal G of which the WB has been adjusted into a luminance signal Y, a color-difference signal Ry between the red signal R and the luminance signal Y, and a color-difference signal By between the blue signal B and the luminance signal Y. When a photographing mode determined by a day-night switching determination unit 7 mentioned later is a day mode, an image signal output selection unit 104 outputs color image data depending on the color-difference signals Ry and By and the luminance signal Y.

In the meantime, when the photographing mode determined by the day-night switching determination unit 7 is a night mode, the image signal output selection unit 104 outputs monochrome (white-and-black) image data depending on the luminance signal Y. In the night mode, an object is photographed in a state where the attenuation area of the infrared cut filter 2 is extracted from the optical path of the image pickup optical system 1. The sensitivity for the wavelength range corresponding to infrared light in the night mode is higher than that in the day mode. In the day mode, an object is photographed in a state where the attenuation area of the infrared cut filter 2 is inserted into the optical path of the image pickup optical system 1.

A screen block division unit 105 divides the image represented by the color-difference signals Ry and By into a plurality of blocks and sends color-difference signals Ry and By that have been divided into the blocks to a visible-light-level obtaining unit 6. Then, the visible-light-level obtaining unit 6 obtains a visible light level as mention later on the basis of the color-difference signals Ry and By that have been divided into the blocks.

The day-night switching determination unit 7 performs a switching determination to switch the photographing mode to the day mode or the night mode on the basis of the object luminance sent from the object luminance obtaining unit 5 and the visible light level sent from the visible-light-level obtaining unit 6, and obtains a determination result. Then, the day-night switching determination unit 7 sends the determination result concerned to the image signal output selection unit 104 and a filter drive unit 8.

As mentioned above, the image signal output selection unit 104 outputs the color image data or the monochrome image data in accordance with the determination result. Moreover, the filter drive unit 8 inserts or extracts the infrared cut filter 2 into or from the optical path of the image pickup optical system 1 according to the determination result.

Hereinafter, the visible light level will be described. The visible light level represents a degree (ratio) of the visible light included in the light that enters into the image sensor 3. Accordingly, the more dominant the infrared light is, the lower the visible light level is. The more dominant the visible light is, the higher the visible light level is.

Figure 2A:
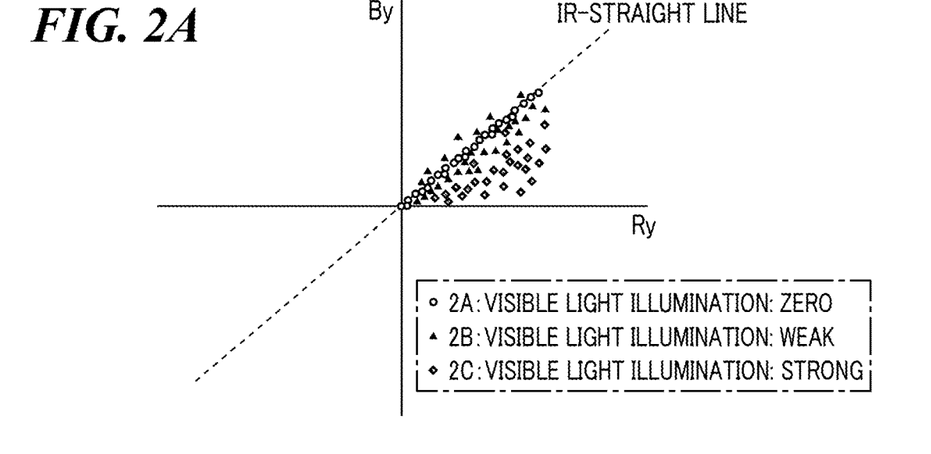
FIG. 2A, FIG. 2B, and FIG. 2C are graphs for describing obtainment of visible light levels in the camera shown in FIG. 1.
Figure 2B:
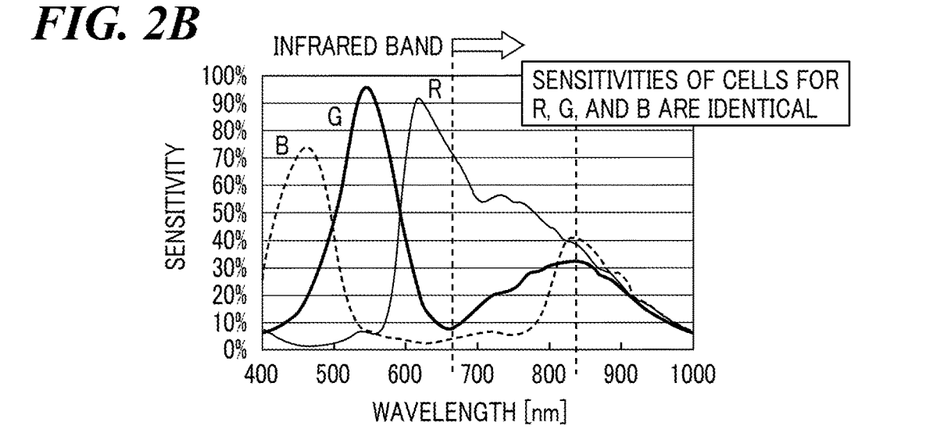
Figure 2C:
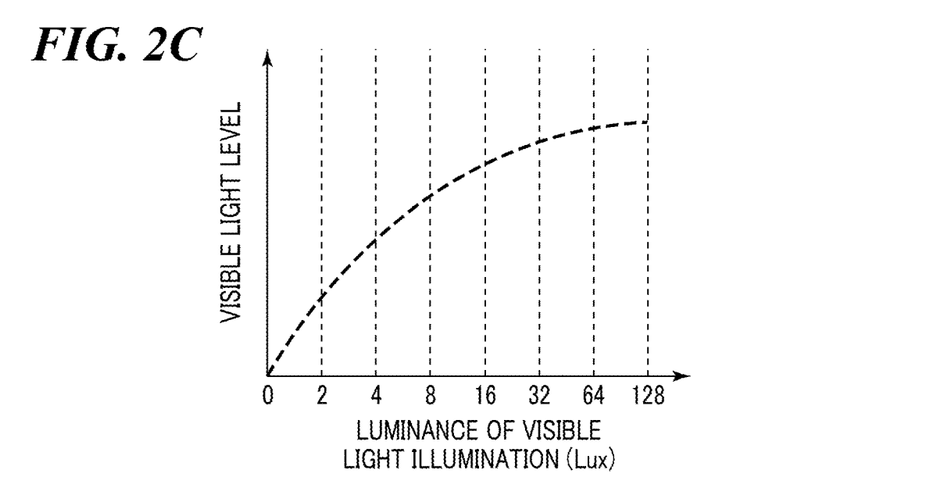

FIG. 2A, FIG. 2B, and FIG. 2C are graphs for describing obtainment of the visible light levels in the camera shown in FIG. 1. FIG. 2A is the graph showing distribution of the coordinate point (Ry, By) of the color-difference signals for every block. FIG. 2B is the graph showing relations (sensitivity characteristics) between wavelength and sensitivity for cells of R, G, and B of the image sensor. Moreover, FIG.

2C is the graph showing a relation between illuminance of the visible-light illumination and the visible light level.

FIG. 2A shows the distribution of the coordinate points (Ry, By) of the color-difference signals for every block in cases where the illuminance of a visible-light illumination device is changed while illuminating an object with the light of which wavelength is 850 nm by an infrared-light illumination device.

When the illuminance of the visible-light illumination device is zero (i.e., infrared-light illumination only), the coordinate points (Ry, By) of the color-difference signals are distributed on a straight line (hereinafter, referred to as an IR straight line) of ratio 1:1. This is because the sensitivities of sensor cells of the image sensor 3 for the respective colors become almost the same in a long wavelength range beyond 800 nm (see FIG. 2B).

When the illuminance of the visible-light illumination device is increased from the zero state, the coordinate points (Ry, By) of the color-difference signals are gradually separated from the IR straight line as shown by the reference numerals 2B and 2C in FIG. 2A. That is, the nearer to the IR straight line the coordinate points (Ry, By) of the color-difference signals are, the more dominant the infrared light is. The farther to the IR straight line the coordinate points are, the more dominant the visible light is. In this embodiment, a distance of the coordinate point (Ry, By) of the color-difference signals from the IR straight line is found for every block, and the total value (or average) of the distances for all the blocks becomes the visible light level.

When the IR straight line is denoted by y=mx+n, the distance d between the IR straight line concerned and the coordinate point (Ry, By) is found by the following formula (1).

$$d = \frac{|B_y - mR_y - n|}{\sqrt{1 + m^2}} \quad (1)$$

As mentioned above, since the IR straight line defines the relation of the ratio 1:1 of the color-difference signals Ry and By, the inclination m becomes 1 and the intercept n becomes 0. However, these values may be adjusted according to the sensitivity characteristic of the image sensor 3 and the actual measured values of the color-difference signals.

As shown in FIG. 2C, when the illuminance of the visible-light illumination is zero (infrared illumination only), the visible light level is equivalent to zero. Then, the visible light level goes up as the visible light increases.

However, the distance from the IR straight line never becomes larger than the inherent color difference distribution of the visible-light illumination device in the color difference distribution shown in FIG. 2A. Accordingly, the increasing rate of the visible light level tends to lower as the visible light illuminance becomes higher.

Figure 3:
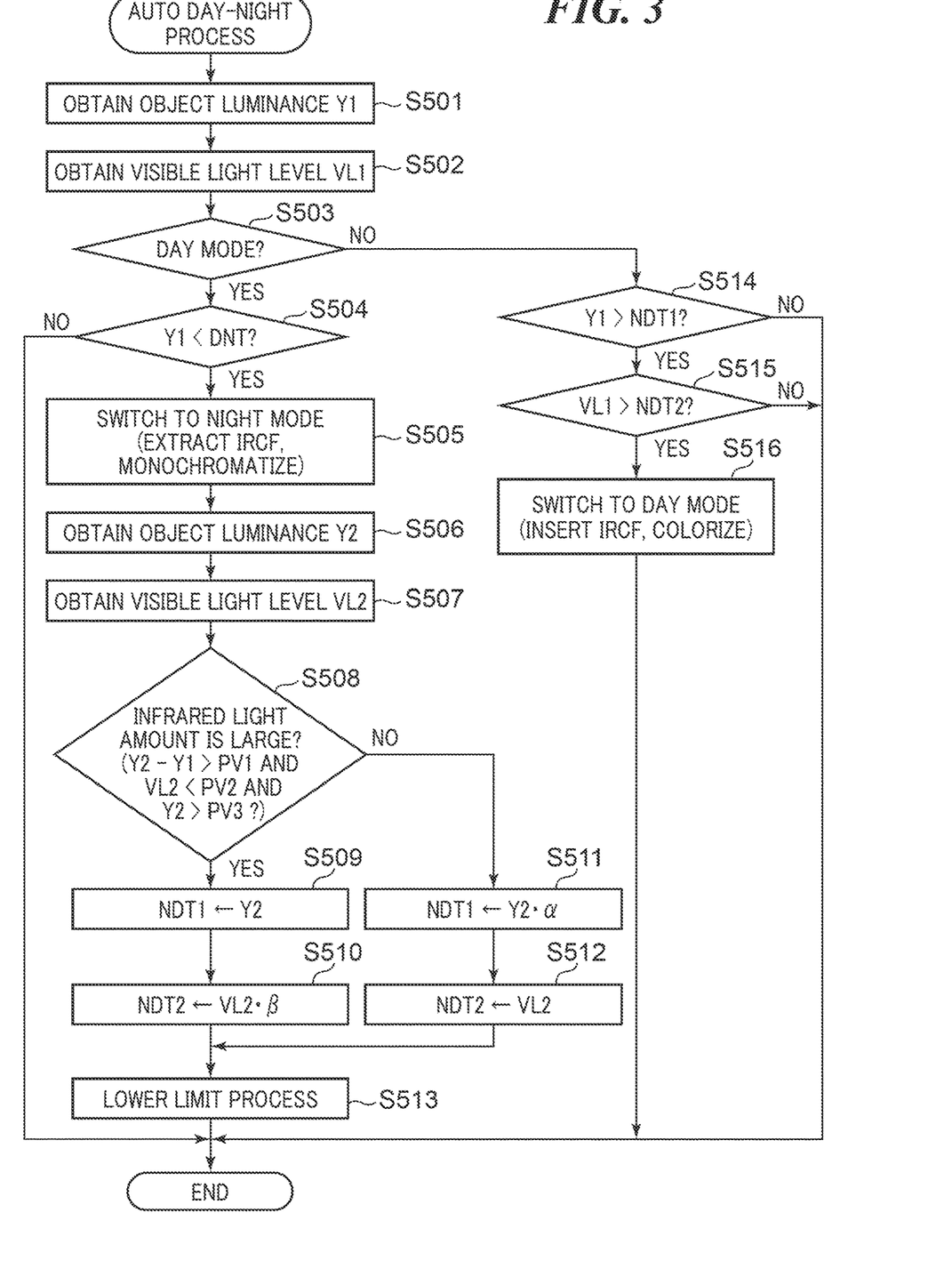
FIG. 3 is a flowchart for describing an example of an auto day-night process performed by the camera shown in FIG. 1.

FIG. 3 is a flowchart for describing an example of an auto day-night process performed by the camera shown in FIG. 1. It should be noted that the process concerning the illustrated flowchart is performed under the control of the overall controller 11.

When the auto day-night process is started, the object luminance obtaining unit 5 obtains the object luminance Y1 that depends on the image signal (step S501). Furthermore, the visible-light-level obtaining unit 6 obtains the visible light level (total or average) VL1 (step S502).

Next, the overall controller 11 determines whether the current photographing mode set up by a mode setting unit (not shown) etc. is the day mode (step S503). When the overall controller 11 determines that the current mode is the day mode (YES in the step S503), the day-night switching determination unit 7 compares the object luminance Y1 with a predetermined DN threshold DNT and obtains a comparison result. Then, the day-night switching determination unit 7 determines whether the object luminance Y1 is smaller than the DN threshold DNT on the basis of the comparison result concerned (step S504).

It should be noted that the DN threshold DNT is used when the day mode is switched to the night mode on the basis of the object luminance Y1.

When determining that the object luminance Y1 is equal to or more than the DN threshold DNT (NO in the step S504), the day-night switching determination unit 7 finishes the auto day-night process.

In the meantime, when determining that the object luminance Y1 is smaller than the DN threshold DNT (YES in the step S504), the day-night switching determination unit 7 determines that it is dark. Then, the day-night switching determination unit 7 sends the determination result showing switching to the night mode to the image signal output selection unit 104 and the filter drive unit 8.

As a result of this, the image signal output selection unit 104 and the filter drive unit 8 switch the photographing mode to the night mode (step S505). That is, the infrared cut filter 2 is extracted from the optical path, and the monochrome image is output.

After switching to the night mode, the object luminance obtaining unit 5 obtains an object luminance Y2 that depends on the image signal (step S506). Furthermore, the visible-light-level obtaining unit 6 obtains a visible light level VL2 (step S507).

Next, the day-night switching determination unit 7 determines whether there is much infrared light on the basis of the object luminances Y1 and Y2 and the visible light level VL2 (step S508). That is, the day-night switching determination unit 7 functions as an obtaining unit that obtains ratio information about the ratios of the infrared light and visible light based on the image signal in the state where the infrared cut filter 2 is extracted from the optical path of the image pickup optical system 1 (the night mode).

It should be noted that this embodiment may be configured to obtain information about degrees of the infrared light and visible light in an environment at the time of photographing besides the accurate ratio information about the infrared light and visible light. That is, this embodiment is not limited to the configuration that obtains the accurate ratio information about the infrared light and visible light. The embodiment includes a configuration that obtains the degrees of the infrared light and visible light in the photographing environment that are enough to determine whether the infrared light or the visible light is dominant in the environment.

In this embodiment, the day-night switching determination unit 7 determines whether the difference between the object luminance Y2 and the object luminance Y1 is larger than a first predetermined value PV1 as a first condition. Moreover, the day-night switching determination unit 7 determines whether the visible light level VL2 is smaller than a second predetermined value PV2 as a second condition. Furthermore, the day-night switching determination unit 7 determines whether the object luminance Y2 is larger than a third predetermined value PV3 as a third condition.

When the difference between the object luminance Y2 and the object luminance Y1 is larger than the first predetermined value PV1 in the first condition, it means that the object luminance became higher by extracting the infrared cut filter 2. This means that the infrared light amount increased relative to the visible light amount.

In the second condition, when visible light level VL2 is less than the second predetermined value PV2, it means that the infrared light is relatively more than the visible light. As mentioned above, the lower the visible light is, the more dominant the infrared light becomes.

When the photographing mode is switched to the night mode in a state where the first condition and second condition are satisfied and the object luminance Y1 is almost equal to zero, the infrared light becomes dominant even if the infrared light amount is less, which causes an erroneous determination that there is much infrared light. In order to prevent such an erroneous determination, it is determined whether the object luminance Y2 exceeds the third predetermined value PV3 as the third condition. This enables correct determination about whether the infrared light amount is much.

It should be noted that the first, second, and third conditions are examples. For example, when the information about the infrared illumination is obtainable, it may be determined whether there is much infrared light on the basis of the information about the infrared illumination concerned. For example, when the infrared-light illumination device is lighting, or when the lighting intensity is more than a designated threshold, it is determined that there is much infrared light.

The day-night switching determination unit 7 continuously sets up a first ND threshold (a first threshold) NDT1 that is compared with the object luminance and a second ND threshold (a second threshold) NDT2 that is compared with the visible light level (steps S509 through S512) on the basis of the ratio information (the determination result in S508). These first ND threshold NDT1 and second ND threshold NDT2 are determination conditions for switching to the day mode from the night mode. That is, the day-night switching determination unit 7 functions as a determination condition setting unit that sets up determination conditions.

Hereinafter, the setting of the first ND threshold NDT1 and second ND threshold NDT2 will be described. In order to prevent hunching certainly, it is preferable to set up the first ND threshold NDT1 and second ND threshold NDT2 on the basis of the object luminance Y2 or the visible light level VL2 while taking hysteresis into consideration. When the first ND threshold NDT1 and second ND threshold NDT2 are set up in consideration of the hysteresis, a switching determination condition to the day mode is not satisfied immediately after switching to the night mode.

When the first, second, and third conditions are satisfied, the day-night switching determination unit 7 determines that there is much infrared light. When there is much infrared light, i.e., when the ratio of the infrared light is more than the ratio of the visible light (YES in the step S508), the day-night switching determination unit 7 sets the first ND threshold NDT1 to the object luminance Y2 (step S509).

Furthermore, the day-night switching determination unit 7 sets the second ND threshold NDT2 in step S510 by multiplying a hysteresis coefficient β to the visible light level VL2 in consideration of hysteresis as shown in a formula (2).

$$NDT2 = VL2 \cdot \beta (1 \leq \beta) \qquad (2)$$

The steps S509 and S510 correspond to a second setting process that sets the first threshold on the basis of the object luminance, and sets the second threshold by multiplying the second hysteresis coefficient to the visible light level.

In the meantime, when there is little infrared light, i.e., when the ratio of the visible light is equal to or more than the ratio of the infrared light (NO in the step S508), the day-night switching determination unit 7 sets the first ND threshold NDT1 in step S511 by multiplying a hysteresis coefficient α to the object luminance Y2 in consideration of hysteresis as shown in a formula (3).

$$NDT1 = Y2 \cdot \alpha (1 \leq \alpha) \qquad (3)$$

Furthermore, the day-night switching determination unit 7 sets the second ND threshold NDT2 to the visible light level VL2 in step S512.

The steps S511 and S512 correspond to a first setting process that sets the first threshold by multiplying the first hysteresis coefficient to the object luminance, and sets the second threshold on the basis of the visible light level.

Incidentally, when the hysteresis is established in the state where the object luminance Y2 and visible light level VL2 used as the references are high, there is a possibility that the photographing mode cannot be switched to the day mode because the first ND threshold NDT1 and second ND threshold NDT2 become too high. Accordingly, in a scene where the object luminance Y2 is high and the visible light level VL2 is low (i.e., there is much infrared light), the hysteresis is established to only the second ND threshold NDT2 defined on the basis of the visible light level VL2 as mentioned above. In the meantime, the first ND threshold NDT1 is equal to or less than the object luminance Y2.

It should be noted that the first ND threshold NDT1 is set to the object luminance Y2 in the illustrated example. This prevents the first ND threshold NDT1 from becoming too high and certainly prevents the photographing mode from switching to the day mode when the visible light level VL1 increases because the infrared light decreases without increasing the visible light.

Moreover, in a scene where the object luminance Y2 is low and the visible light level VL2 is high (i.e., there is little infrared light), the hysteresis is established to only the first ND threshold NDT1 defined on the basis of the object luminance Y2. In the meantime, the second ND threshold NDT2 is equal to or less than the visible light level VL2.

It should be noted that the second ND threshold NDT2 is set to the visible light level VL2 in the illustrated example. This prevents the second ND threshold NDT2 from becoming too high and certainly prevents the photographing mode from switching to the day mode when the object luminance Y2 increases because the infrared light increases.

The hysteresis coefficient β used for setting the second ND threshold NDT2 is preferably variable. As shown in FIG. 2C, the increasing rate of the visible light level tends to lower as the visible light illuminance becomes higher. Accordingly, if the hysteresis coefficient is a fixed value, the timing at which the photographing mode is switched to the day mode delays as the visible light lighting illuminance becomes higher.

The hysteresis coefficient β is decreased as the visible light level becomes larger or the difference of the object luminances Y2 and Y1 becomes smaller. This reduces the unnecessary period of photographing in the night mode.

The day-night switching determination unit 7 performs a lower limit process about the first ND threshold NDT1 and second ND threshold NDT2 (step S513) after the process in the step S510 or S512. If the first ND threshold NDT1 and second ND threshold NDT2 that are set up in the above-mentioned steps S509 through S512 are too small, even if the photographing mode is switched to the day mode, it may be switched to the night mode again because the increase in brightness is insufficient.

Accordingly, when the first ND threshold NDT1 and the second ND threshold NDT2 are respectively less than a predetermined first lower limit and a second lower limit, the day-night switching determination unit 7 respectively sets the first ND threshold NDT1 and the second ND threshold NDT2 to the first lower limit and the second lower limit.

It should be noted that the first lower limit is equal to or more than the DN threshold DNT in this case. The day-night switching determination unit 7 finishes the auto day-night process after the process in the step S513.

In this way, since the first ND threshold NDT1 and second ND threshold NDT2 are set depending on the determination of the infrared light amount, the hunching is prevented certainly and the day mode and night mode are switched at the optimal timing.

When the overall controller 11 determines that the current mode is the night mode (NO in the step S503), the day-night switching determination unit 7 compares the object luminance Y1 with the first ND threshold NDT1 and obtains a first comparison result. Then, the day-night switching determination unit 7 determines whether the object luminance Y1 is larger than the first ND threshold NDT1 on the basis of the comparison result (step S514).

When determining that the object luminance Y1 is larger than the first ND threshold NDT1 (YES in the step S514), the day-night switching determination unit 7 determines that it is light. In this case, the day-night switching determination unit 7 performs a process in the following step S515 because the hunching may occur in a case where the object luminance becomes high due to the infrared illumination.

The day-night switching determination unit 7 compares the visible light level VL1 with the second ND threshold NDT2 and obtains a second comparison result. Then, the day-night switching determination unit 7 determines whether the visible light level VL1 is larger than the second ND threshold NDT2 (step S515). When determining that the visible light level VL1 is larger than the second ND threshold NDT2 (YES in the step S515), the day-night switching determination unit 7 determines that much visible light is included. Then, the day-night switching determination unit 7 sends the determination result showing switching to the day mode to the image signal output selection unit 104 and the filter drive unit 8.

As a result of this, the image signal output selection unit 104 and the filter drive unit 8 switch the photographing mode to the day mode (step S516). That is, the infrared cut filter 2 is inserted into the optical path, and the color image is output. Then, the day-night switching determination unit 7 finishes the auto day-night process. The day-night switching determination unit 7 functions as a determination unit that determines whether the attenuation area of the infrared cut filter 2 is insert into the optical path of the image pickup optical system 1 on the basis of the first comparison result and the second comparison result.

When determining that the object luminance Y1 is equal to or less than the first ND threshold NDT1 (NO in the step S514), the day-night switching determination unit 7 finishes the auto day-night process. Moreover, when determining that the visible light level VL1 is equal to or less than the second ND threshold NDT2 (NO in the step S515), the day-night switching determination unit 7 finishes the auto day-night process.

In this way, the hunching is certainly prevented at low cost, and the day mode and night mode are switched at the optimal timing in the first embodiment of the present invention.

Subsequently, one example of a camera according to a second embodiment of the present invention will be described. It should be noted that the configuration of the camera according to the second embodiment is the same as the camera shown in FIG. 1.

Figure 4:
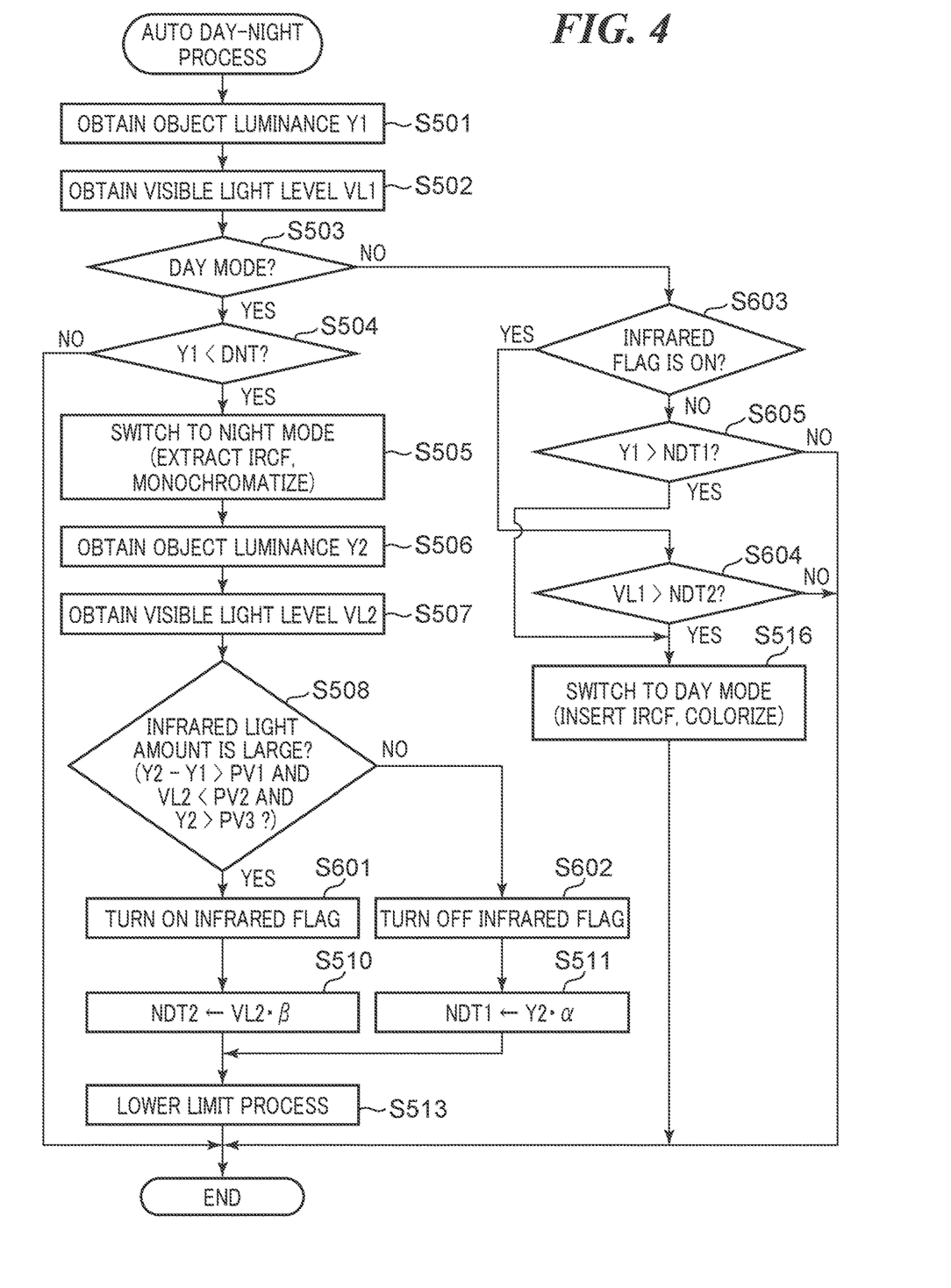
FIG. 4 is a flowchart for describing an example of the auto day-night process performed by the camera according to a second embodiment of the present invention.

FIG. 4 is a flowchart for describing an example of the auto day-night process performed by the camera according to the second embodiment of the present invention. It should be noted that the steps in FIG. 4 that are the same as the steps in the flowchart in FIG. 3 are indicated by the same reference numbers and their descriptions are omitted.

When it is determined that there is much infrared light (YES in the step S508), the day-night switching determination unit 7 turns ON an infrared flag (validates infrared information) in step S601. Furthermore, this infrared flag is used for storing the determination result of the process in the step S508. Then, the day-night switching determination unit 7 proceeds with the process to the step S510.

In the meantime, when there is little infrared light (NO in the step S508), the day-night switching determination unit 7 turns OFF the infrared flag (invalidates the infrared information) in step S602. Then, the day-night switching determination unit 7 proceeds with the process to the step S511.

When the overall controller 11 determines that the current photographing mode is the night mode (NO in the step S503), the day-night switching determination unit 7 determines whether the infrared flag is ON (step S603).

When the infrared flag is ON (YES in the step S603), it is assumed that reliability of the object luminance Y1 as a parameter about the visible light lighting illuminance becomes lower because the much infrared light amount increases the object luminance Y1. Accordingly, the day-night switching determination unit 7 compares the visible light level VL1 with the second ND threshold NDT2 without comparing the object luminance Y1 with the first ND threshold NDT1. Then, the day-night switching determination unit 7 determines whether the visible light level VL1 is larger than the second ND threshold NDT2 (step S604).

When the visible light level VL1 is larger than the second ND threshold NDT2 (YES in the step S604), the day-night switching determination unit 7 proceeds with the process to the step S516. When the visible light level VL1 is equal to or less than the second ND threshold NDT2 (NO in the step S604), the day-night switching determination unit 7 finishes the auto day-night process.

When the infrared flag is OFF (NO in the step S603), it is assumed that noise occurs in the image signal because the gain multiplied to the image signal increases due to little infrared light amount. Then, if the noise occurs, the visible light level obtained using the color-difference signals is not stabilized and the reliability becomes low.

Accordingly, the day-night switching determination unit 7 compares the object luminance Y1 with the first ND threshold NDT1 without comparing the visible light level VL1 with the second ND threshold NDT2. Then, the day-night switching determination unit 7 determines whether the object luminance Y1 is larger than the first ND threshold NDT1 (step S605).

When the visible light level VL1 is larger than the first ND threshold NDT1 (YES in the step S605), the day-night switching determination unit 7 proceeds with the process to the step S516. When the visible light level VL1 is equal to or less than the first ND threshold NDT1 (NO in the step S605), the day-night switching determination unit 7 finishes the auto day-night process.

In this way, since the ND threshold setting process and the comparison process are simplified depending on the determination result of the infrared light amount in the second embodiment of the present invention, the throughput is reducible. Furthermore, as with the first embodiment, the hunching is certainly prevented at the low cost and the day mode and the night mode are switched at the optimal timing.

Subsequently, one example of a camera according to a third embodiment of the present invention will be described.

Figure 5:
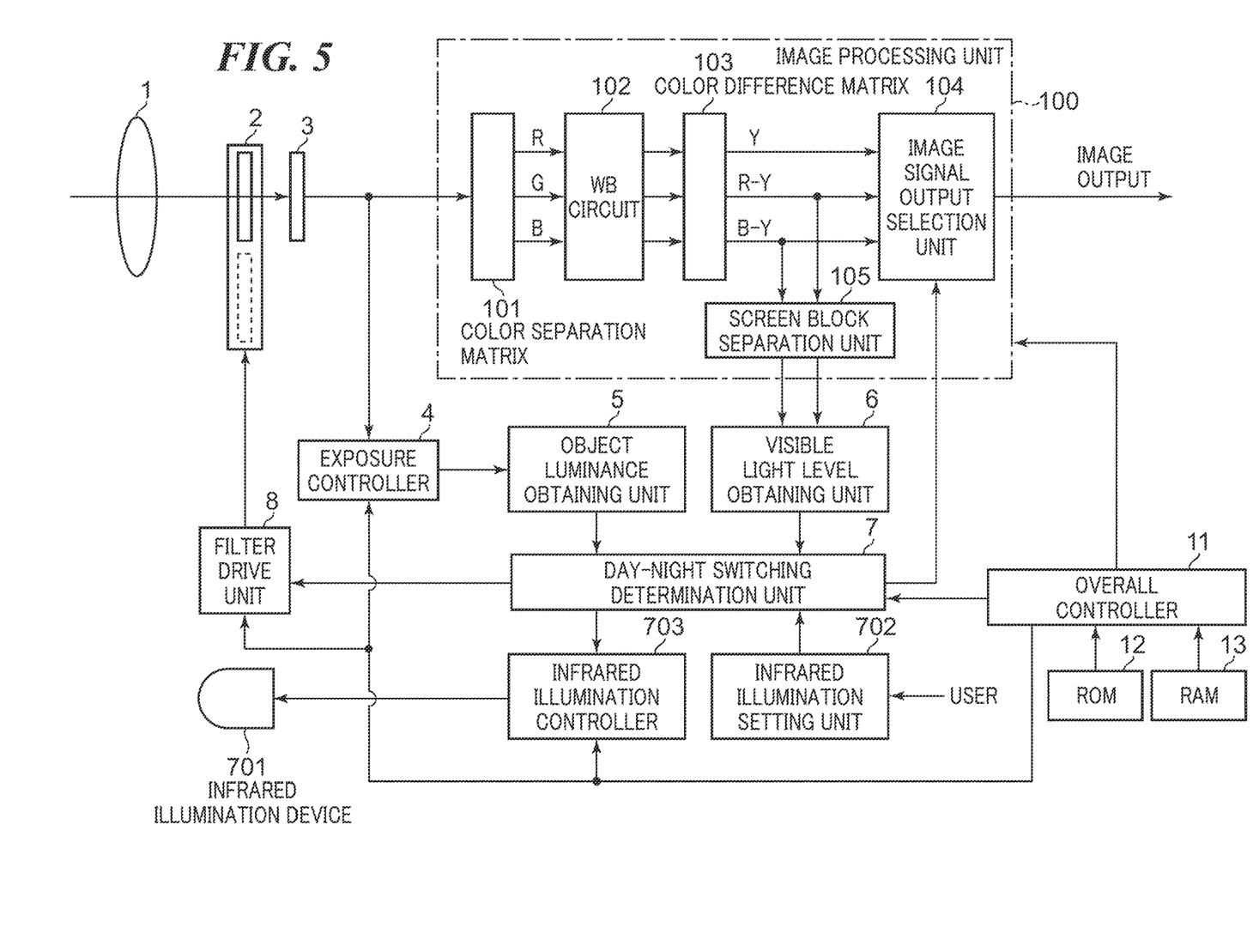
FIG. 5 is a block diagram schematically showing a configuration of an example of a camera according to a third embodiment of the present invention.

FIG. 5 is a block diagram schematically showing a configuration of the example of the camera according to the third embodiment of the present invention. It should be noted that the same reference numerals are assigned to components in FIG. 5 that are the same as the components of the camera shown in FIG. 1.

The illustrated camera has an infrared-light illumination device 701, infrared illumination setting unit 702, and infrared illumination controller 703. Then, the infrared illumination controller 703 is controlled by the overall controller 11. The illustrated camera irradiates the object with the infrared light using the infrared-light illumination device 701 and is able to photograph brightly in the night mode even in a low illumination state.

A user selects whether to use the infrared-light illumination device 701 through the infrared illumination setting unit 702. The infrared illumination setting set through the infrared illumination setting unit 702 is sent to the day-night switching determination unit 7. Then, the day-night switching determination unit 7 controls the infrared-light illumination device 701 through the infrared illumination controller 703 depending on the infrared illumination setting concerned.

Specifically, when the infrared illumination setting shows use of the infrared-light illumination device 701 and when the day-night switching determination unit 7 switches to the night mode, the infrared illumination controller 703 turns ON the infrared-light illumination device 701. Moreover, when the day-night switching determination unit 7 switches to the day mode, the infrared-light illumination device 701 is turned OFF through the infrared illumination controller 703.

In the meantime, when the infrared illumination setting does not show use of the infrared-light illumination device 701, the day-night switching determination unit 7 always turns off the infrared-light illumination device 701 through the infrared illumination controller 703.

It should be noted that the infrared-light illumination device 701 is not necessarily mounted on the camera. For example, the infrared-light illumination device 701 may be installed near the camera and the camera may control ON/OFF of the infrared-light illumination device 701.

Figure 6:
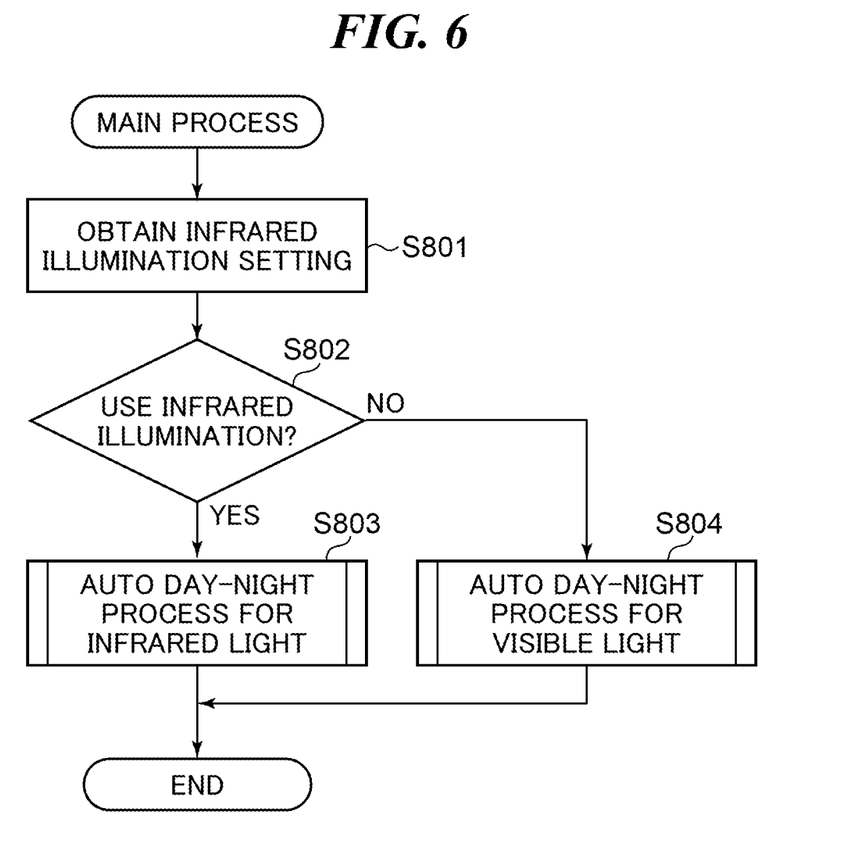
FIG. 6 is a flowchart for describing a main process in the auto day-night process performed by the camera shown in FIG. 5.

FIG. 6 is a flowchart for describing a main process in the auto day-night process performed by the camera shown in FIG. 5. It should be noted that the process concerning the illustrated flowchart is performed under the control of the overall controller 11.

When the main process is started, the day-night switching determination unit 7 obtains the infrared illumination setting set by the infrared illumination setting unit 702 (step S801). Then, the day-night switching determination unit 7 determines whether the infrared illumination setting shows use of the infrared-light illumination device 701 (step S802).

When the setting shows use of the infrared-light illumination device 701 (YES in the step S802), the day-night switching determination unit 7 performs an auto day-night process for infrared light mentions later (step S803). Then, the day-night switching determination unit 7 finishes the main process.

In the meantime, when the setting does not show use of the infrared-light illumination device 701 (NO in the step S802), the day-night switching determination unit 7 performs an auto day-night process for visible light mentioned later (step S804). Then, the day-night switching determination unit 7 finishes the main process.

Figure 7:
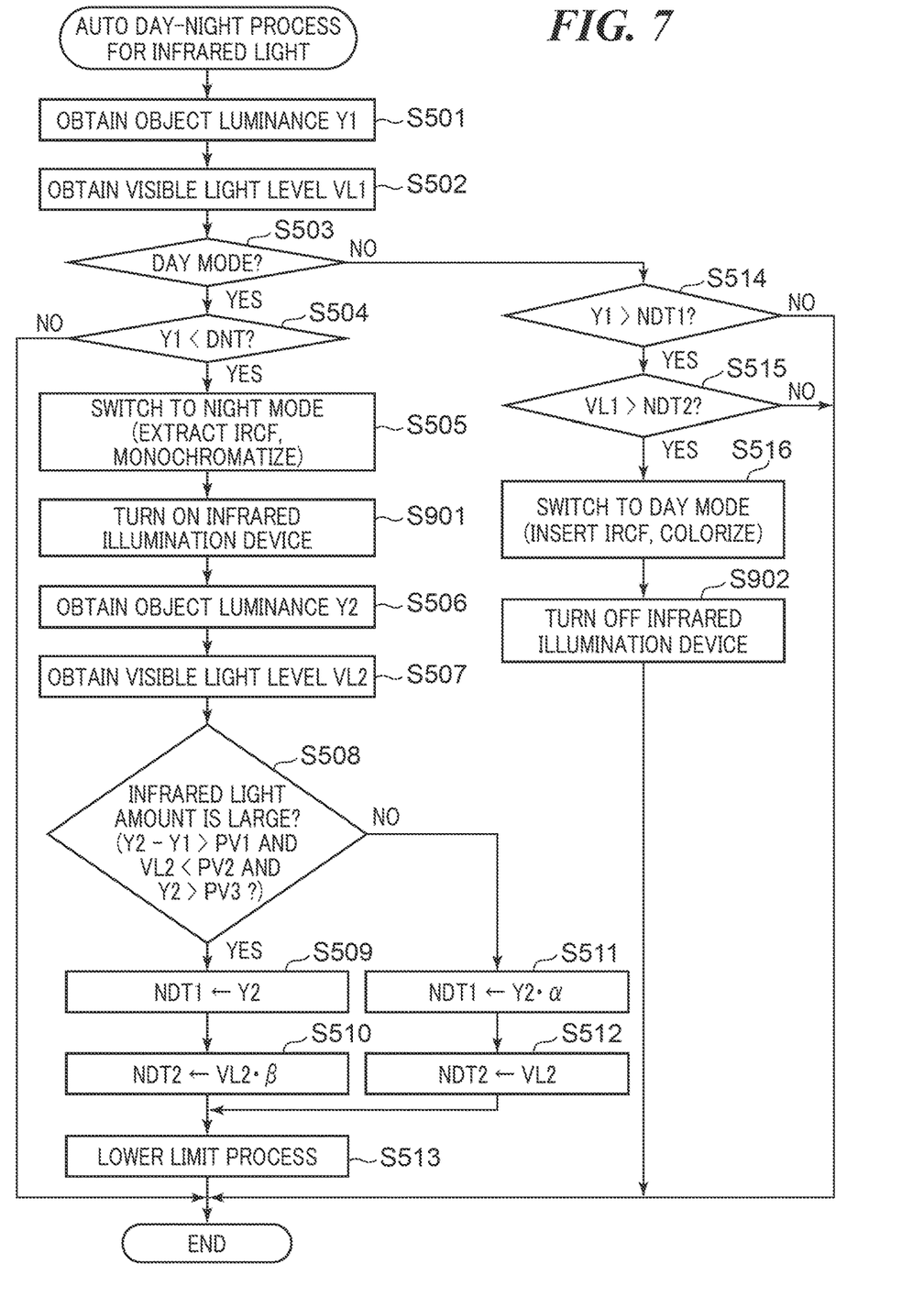
FIG. 7 is a flowchart for describing the auto day-night process for infrared light shown in FIG. 6.

FIG. 7 is a flowchart for describing the auto day-night process for infrared light shown in FIG. 6. It should be noted that the steps in FIG. 7 that are the same as the steps in the flowchart in FIG. 3 are indicated by the same reference numbers and their descriptions are omitted.

The day-night switching determination unit 7 turns ON the infrared-light illumination device 701 through the infrared illumination controller 703 after the process in the step S505 (step S901). Then, the day-night switching determination unit 7 proceeds with the process to the step S506.

Moreover, the day-night switching determination unit 7 turns OFF the infrared-light illumination device 701 through the infrared illumination controller 703 after the process in the step S516 (step S902). Then, the day-night switching determination unit 7 finishes the auto day-night process for infrared light.

It should be noted that the turning ON/OFF control of the infrared-light illumination device 701 shown in FIG. 7 may be added to the auto day-night process shown in FIG. 4.

Figure 8:
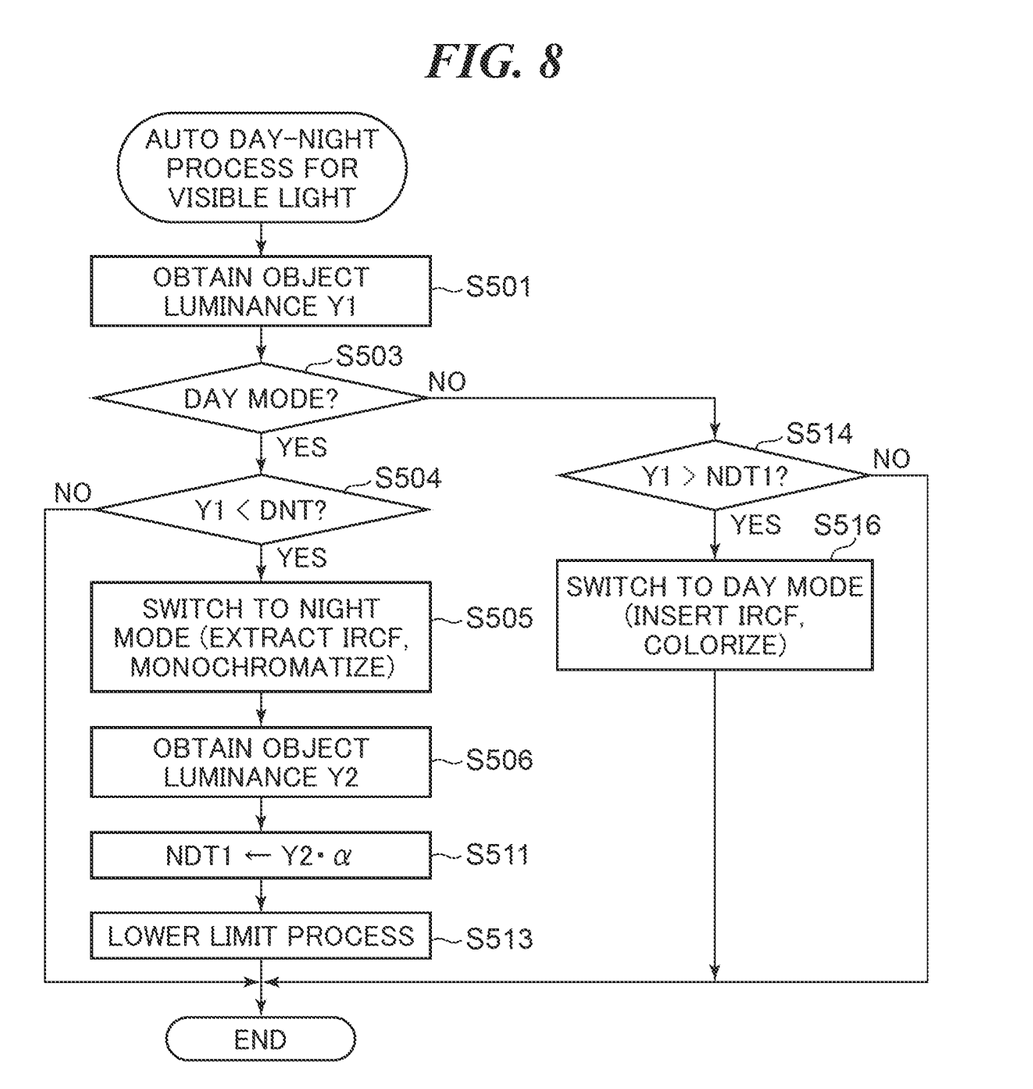
FIG. 8 is a flowchart for describing an auto day-night process for visible light shown in FIG. 6.

FIG. 8 is a flowchart for describing the auto day-night process for visible light shown in FIG. 6. It should be noted that the same reference numbers are assigned to the steps in FIG. 8 that are identical to the steps in the flowchart in FIG. 3.

As shown in FIG. 8, the day-night switching determination unit 7 performs the process in the step S503 after the process in the step S501. Moreover, the day-night switching determination unit 7 performs the process in the step S511 after the process in the step S506, and then, performs the process in the step S513.

Furthermore, when determining that the object luminance Y1 is larger than the first ND threshold NDT1 (YES in the step S514), the day-night switching determination unit 7 performs the process in the step S516.

In this way, the auto day-night process is certainly performed even under the infrared illumination environment by performing the process using the visible light level in the auto day-night process for infrared light in the third embodiment of the present invention.

Furthermore, since the auto day-night process for visible light does not use the infrared illumination, the auto day-night process is stably performed without using the visible light level. Then, the processing load at the time of calculating the visible light level is reduced, and it is unnecessary to consider the influence of the noise to the visible light level.

As mentioned above, the hunching is certainly prevented at low cost, and the day mode and night mode are switched at the optimal timing in the third embodiment of the present invention.

Although the present invention was described on the basis of the embodiments, the present invention is not limited to the embodiments, and the present invention includes various configurations that do not deviate from the scope of the invention.

For example, the functions of the above-mentioned embodiments may be achieved as a control method that is executed by the image pickup apparatus. Moreover, the functions of the above-mentioned embodiments may be achieved as a control program that is executed by a computer of the image processing apparatus. It should be noted that the control program is recorded on a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099822, filed May 24, 2018, which is hereby incorporated by reference herein in its entirety.

What is claimed is:

1. An image pickup apparatus comprising:
an image sensor that outputs an image signal depending on an optical image formed through an image pickup optical system; and
at least one processor that executes a set of instructions to:
set a photographing mode for photographing using the image sensor from among a day mode and a night mode in which sensitivity for a wavelength range corresponding to infrared light is higher than that in the day mode;
obtain an object luminance and a visible light level from the image signal in the night mode;
determine whether infrared light or visible light is dominant in the night mode based on the object luminance and the visible light level; and
set a first threshold for the object luminance and a second threshold for the visible light level based on the determination result, the first threshold and the second threshold being used for switching the photographing mode to the day mode from the night mode;
wherein in a case where visible light is dominant in the night mode, the first threshold and the second threshold are set such that the first threshold is higher than the object luminance and the second threshold is equal to or lower than the visible light level.

2. The image pickup apparatus according to claim 1, further comprising an infrared cut filter provided with an attenuation area that reduces intensity of light in a wavelength range corresponding to infrared light in the object light that enters into the image sensor,
wherein the night mode is a photographing mode in which an object is photographed in a state where the attenuation area of the infrared cut filter is extracted from an optical path of the image pickup optical system,
wherein the day mode is a photographing mode in which an object is photographed in a state where the attenuation area of the infrared cut filter is inserted into the optical path of the image pickup optical system, and
wherein the at least one processor executes instructions to set the first threshold for the object luminance and a second threshold for the visible light level that are used for inserting the attenuation area of the infrared cut filter into the optical path of the image pickup optical system from the state where the attenuation area of the infrared cut filter is extracted from the optical path of the image pickup optical system.

3. The image pickup apparatus according to claim 1, wherein in a case where infrared light is dominant in the night mode, the first threshold and the second threshold are set such that the first threshold is equal to or lower than the object luminance and the second threshold is higher than the visible light level.

4. The image forming apparatus according to claim 1, wherein the at least one processor executes instructions to perform a first setting process to set the first threshold by multiplying a first hysteresis coefficient to the object luminance and to set the second threshold based on the visible light level in a case where the visible light is dominant in the night mode.

5. The image forming apparatus according to claim 3, wherein the at least one processor executes instructions to perform a second setting process to set the first threshold based on the object luminance and to set the second threshold by multiplying a second hysteresis coefficient to the visible light level in a case where the infrared light is dominant in the night mode.

6. The image forming apparatus according to claim 2, wherein the at least one processor executes instructions to determine that the attenuation area of the infrared cut filter should be inserted into the optical path in a case where the object luminance exceeds the first threshold and the visible light level exceeds the second threshold.

7. The image forming apparatus according to claim 1, wherein the at least one processor executes instructions to invalidate infrared information showing that there is much infrared light and set the first threshold by multiplying a first hysteresis coefficient to the object luminance in a case where the visible light is dominant in the night mode.

8. The image forming apparatus according to claim 7, wherein the at least one processor executes instructions to validate the infrared information and set the second threshold by multiplying a second hysteresis coefficient to the visible light level in a case where the infrared light is dominant in the night mode.

9. The image forming apparatus according to claim 8, wherein the at least one processor executes instructions to:

determine that the attenuation area of the infrared cut filter should be inserted into the optical path in a case where the infrared information is invalid and the object luminance exceeds the first threshold in the first comparison result, and determine that the attenuation area of the infrared cut filter should be inserted into the optical path in a case where the infrared information is valid and the visible light level exceeds the second threshold in the second comparison result.

10. The image forming apparatus according to claim 5, wherein the at least one processor executes instructions to perform the first setting process and the second setting process under infrared light illumination in a case where a user selects to illuminate an object with infrared light at a time of photographing.

11. The image forming apparatus according to claim 10, wherein the at least one processor executes instructions to determine that the attenuation area of the infrared cut filter should be inserted into the optical path and determine to turn off the infrared light illumination in a case where the object luminance exceeds the first threshold in the first comparison result and the visible light level exceeds the second threshold in the second comparison result.

12. The image forming apparatus according to claim 1, wherein the at least one processor executes instructions to set the first threshold by multiplying a first hysteresis coefficient to the object luminance in a case where a user does not select to illuminate an object with infrared light at a time of photographing.

13. The image forming apparatus according to claim 12, wherein the at least one processor executes instructions to determine that the attenuation area of the infrared cut filter should be inserted into the optical path in a case where the object luminance exceeds the first threshold.

14. The image pickup apparatus according to claim 1, wherein the at least one processor executes instructions to:
  obtain image data by applying a predetermined image process to the image signal;
  output the image data as monochrome image data in the night mode; and
  output the image data as color image data in the day mode.

15. A control method for an image pickup apparatus provided with an image sensor that outputs an image signal depending on an optical image formed through an image pickup optical system, the control method comprising:

setting a photographing mode for photographing using the image sensor from among a day mode and a night mode in which sensitivity for a wavelength range corresponding to infrared light is higher than that in the day mode;
  obtaining an object luminance and a visible light level from the image signal in the night mode;
  determining whether infrared light or visible light is dominant in the night mode based on the object luminance and the visible light level; and
  setting a first threshold for the object luminance and a second threshold for the visible light level based on the determination result, the first threshold and the second threshold being used for switching the photographing mode to the day mode from the night mode,
  wherein in a case where visible light is dominant in the night mode, the first threshold and the second threshold are set such that the first threshold is higher than the object luminance and the second threshold is equal to or lower than the visible light level.

16. A non-transitory computer-readable storage medium storing a control program causing a computer to execute a control method for an image pickup apparatus provided with an image sensor that outputs an image signal depending on an optical image formed through an image pickup optical system, the control method comprising:

setting a photographing mode for photographing using the image sensor from among a day mode and a night mode in which sensitivity for a wavelength range corresponding to infrared light is higher than that in the day mode;
  obtaining an object luminance and a visible light level from the image signal in the night mode;
  determining whether infrared light or visible light is dominant in the night mode based on the object luminance and the visible light level; and
  setting a first threshold for the object luminance and a second threshold for the visible light level based on the determination result, the first threshold and the second threshold being used for switching the photographing mode to the day mode from the night mode,
  wherein in a case where visible light is dominant in the night mode, the first threshold and the second threshold are set such that the first threshold is higher than the object luminance and the second threshold is equal to or lower than the visible light level.

\* \* \* \* \*

UNITED STATES PATENT AND TRADEMARK OFFICE
CERTIFICATE OF CORRECTION

| | |
|---|---|
| PATENT NO. | : 11,310,435 B2 |
| APPLICATION NO. | : 17/105803 |
| DATED | : April 19, 2022 |
| INVENTOR(S) | : Ryo Kawasaki |

It is certified that error appears in the above-identified patent and that said Letters Patent is hereby corrected as shown below:

On the Title Page

In Item (73) Assignee: the name of the Assignee is listed as CANON KABUSHIKIKAISHA.
The Assignee name should appear as follows:
--CANON KABUSHIKI KAISHA--

Signed and Sealed this
Eleventh Day of October, 2022

Katherine Kelly Vidal
*Director of the United States Patent and Trademark Office*